US007860183B2

(12) United States Patent
Maltsev et al.

(10) Patent No.: US 7,860,183 B2
(45) Date of Patent: Dec. 28, 2010

(54) MULTIPLE-INPUT MULTIPLE-OUTPUT MULTICARRIER COMMUNICATION SYSTEM WITH JOINT TRANSMITTER AND RECEIVER ADAPTIVE BEAMFORMING FOR ENHANCED SIGNAL-TO-NOISE RATIO

(75) Inventors: Alexander Alexandrovich Maltsev, Novgorod (RU); Roman Olegovich Maslennikov, Novgorod (RU); Alexey Vladimirovich Khoryaev, Dzerzhinsk (RU)

(73) Assignee: Intel Corporation, Santa Clara, CA (US)

( * ) Notice: Subject to any disclaimer, the term of this patent is extended or adjusted under 35 U.S.C. 154(b) by 1138 days.

(21) Appl. No.: 11/422,104

(22) Filed: Jun. 5, 2006

(65) Prior Publication Data

US 2008/0117997 A1    May 22, 2008

Related U.S. Application Data

(63) Continuation of application No. PCT/RU2005/000150, filed on Mar. 30, 2005.

(51) Int. Cl.
*H04B 7/02* (2006.01)
(52) U.S. Cl. .................. 375/267; 370/208; 375/260; 700/53; 706/24
(58) Field of Classification Search .................. 370/210
See application file for complete search history.

(56) References Cited

U.S. PATENT DOCUMENTS 7,324,437 B1 * 1/2008 Czylwik et al. ............. 370/210

| | | | |
|---|---|---|---|
| 2004/0120411 A1 | 6/2004 | Walton et al. | |
| 2005/0002326 A1 | 1/2005 | Ling et al. | |
| 2005/0180386 A1 * | 8/2005 | Hansen et al. | 370/350 |
| 2006/0245513 A1 * | 11/2006 | Koo et al. | 375/267 |

FOREIGN PATENT DOCUMENTS

WO    WO-2005011178 A2    2/2005

OTHER PUBLICATIONS

Choi et al; Interpolation based transmit beamforming for MIMO-OFDM with limited feedback; IEEE Transactions on Signal Processing; Nov. 2005, pp. 4125-4135.*
Choi, J., et al., "Interpolation Based Transmit for MIMO-OFDM with Limited Feedback", *Communications, IEEE International Conference*, (Jun. 20, 2004),249-253.
International Search Report for PCT/RU2005/000150, Int'l. Filing Date Mar. 30, 2005, Intel Corporation.

* cited by examiner

*Primary Examiner*—David C Payne
*Assistant Examiner*—Adolf Dsouza
(74) *Attorney, Agent, or Firm*—Schwegman, Lundberg & Woessner, P.A.; Gregory J. Gorrie

(57) ABSTRACT

A system for communicating through a multicarrier communication channel estimates a channel transfer function $H_{nm}(K)$ each of a plurality of subcarriers of a multicarrier communication channel from received training signals. The system also estimates a spatial correlation matrix $R_{nn}(k)$ for each subcarrier from noise and interference samples obtained during the reception of the training signals through two or more receive-signal paths. Receiver and transmitter beamformer weights may be generated for the subcarriers using the channel transfer function $H_{nm}(k)$ and the spatial correlation matrices $R_{nn}(k)$ for use in subsequent communication through the channel.

22 Claims, 3 Drawing Sheets

MULTIPLE-INPUT MULTIPLE-OUTPUT MULTICARRIER COMMUNICATION SYSTEM WITH JOINT TRANSMITTER AND RECEIVER ADAPTIVE BEAMFORMING FOR ENHANCED SIGNAL-TO-NOISE RATIO

This application is a continuation under 35 U.S.C. 111(a) of International Application No. PCT/RU2005/000150, filed on Mar. 30, 2005, which is incorporated herein by reference.

TECHNICAL FIELD

Some embodiments of the present invention pertain to multicarrier multiple-input multiple-output (MIMO) communication systems, some embodiments pertain to orthogonal frequency division multiplexed (OFDM) communications, and some embodiments pertain to multi-antenna beamforming.

BACKGROUND

One problem with many modern communication systems that employ frequency reuse is that co-channel interference and noise reduce the signal-to-noise ratio of received signals. This reduced signal-to-noise ratio may reduce a system's throughput. In some wireless local area network (WLAN) and some wireless metropolitan area network (WMAN) environments, co-channel interference may become a restricting factor in reaching the maximum throughput possible with these systems. Co-channel interference has conventionally been difficult if not impossible to reduce.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiment of the invention set forth in the claims encompass all available equivalents of those claims. Embodiments of the invention may be referred to, individually or collectively, hereto by the term "invention" merely for convenience and without intending to limit the scope of this application to my single invention or inventive concept if more than one is in fact disclosed.

Figure 1:
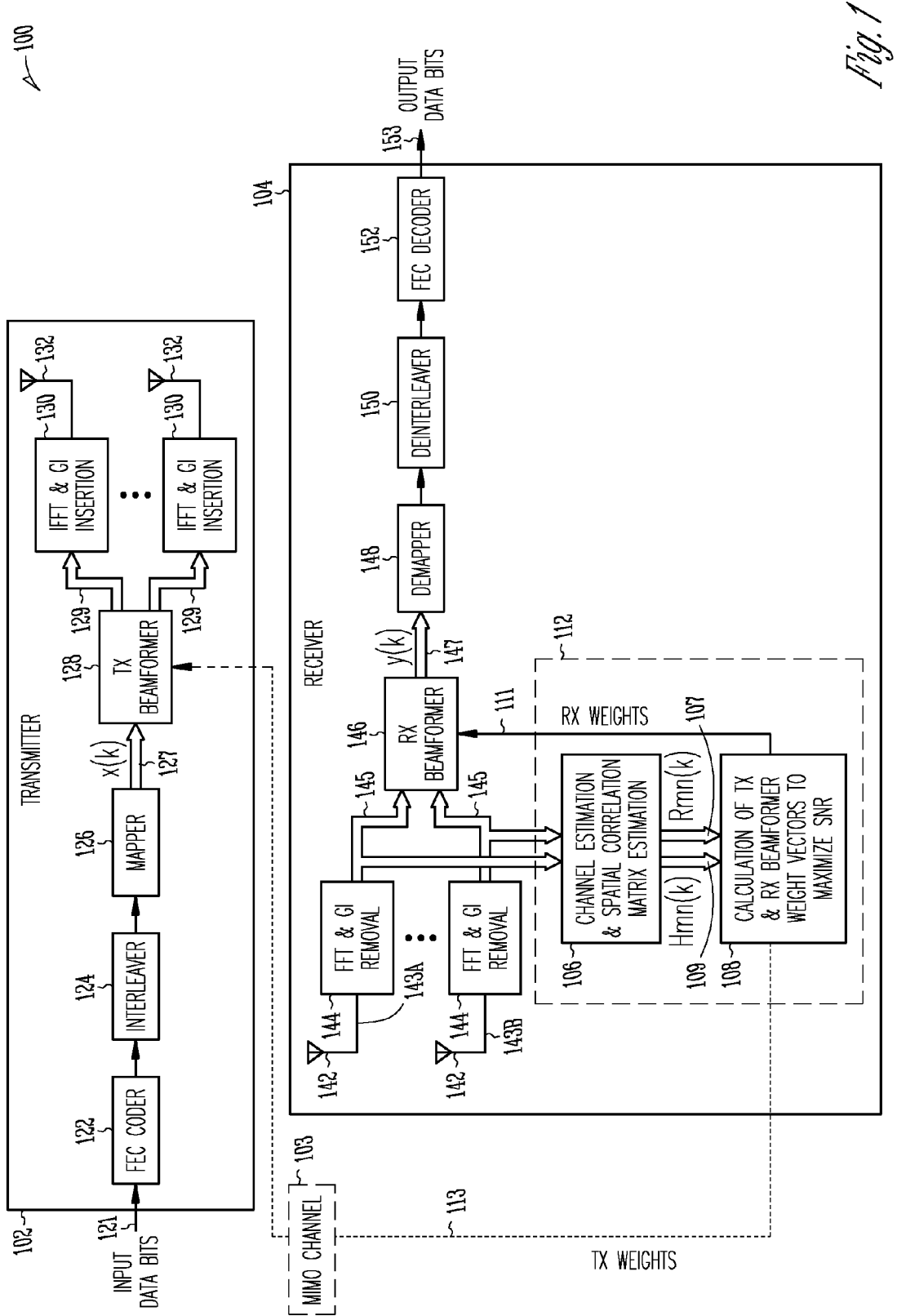
FIG. 1 illustrates a multiple-input multiple-out put (MIMO) communication system accordance with some embodiments of the present invention.

FIG. 1 illustrate a multiple-input multiple-output (MIMO) communication system accordance with some embodiments of the present invention. MIMO communication system 100 may include transmitter 102 and receiver 104 which may communicate multicarrier communication signals through channel 103. Transmitter 102 may use two or more transmit antennas 132 to transmit signals and receiver 104 may use two or more receive antennas 142 to receive the transmitted signals. The example embodiment of FIG. 1 illustrates two spatially-diverse transmit antennas 132 and two spatially-diverse receive antennas 142 defining a 2×2 MIMO channel, although, the scope of the invention is not limited in this respect. The use of multiple transmit and receive antennas allows system 100 to take advantage of antenna diversity to help achieve increased data rates, lower packet error rates and/or increased signal-to-noise ratios, among other things.

Transmitter 102 may include encoder 122 to encode input bit stream 121, interleaver 124 to perform an interleaving operation on the encoded bit stream, and mapper 126 to map the encoded bits to symbols. The symbols may be each associated with a subcarrier of a plurality of frequency subcarriers that may comprise a multicarrier communication signal that may be transmitted by transmitter 102. Transmitter 102 may also include transmitter (TX) beamformer 128 to apply transmitter beamformer weights 113 to the subcarriers to generate a set of symbol-modulated subcarriers for transmission by each of antennas 132. Transmitter 102 may also comprise inverse Fourier transform circuitry 130 associated with each transmit antenna 132 to convert frequency-domain symbol modulated subcarriers 129 to time-domain signals. In some embodiments, inverse Fourier transform circuitry 130 may perform inverse fast Fourier transforms (IFFTs) and may add a guard interval (GI), although the scope of the invention is not limited in this respect. Transmitter 102 may also lactate radio-frequency (RF) transmitter circuitry (not illustrated) to generate RF signals for transmission by antennas 132.

Receiver 104 comprises Fourier transform circuitry 144 associated with each receive signal path to generate frequency-domain signals 145 for each subcarrier for each receive signal path. Receiver 104 may also include RF receiver circuitry (not illustrated) to convert received RF signals to digital time-domain signals for use by Fourier transform circuitry 144. Receiver 104 also comprise receiver (RX) beamformer 146 to apply beamformer weights 111 to the frequency-domain signals 145 for each subcarrier for each receive signal path and to generate combined frequency-domain signals 147 for demapping by demapper 148. Demapper 148 may generate demapped bits from symbols associated with each data subcarrier. Receiver 104 may also include deinterleaver 150 to perform a deinterleaving operation on the demapped bits and decoder 152 to decode the demapped bits.

In some embodiments, receiver 104 also may comprise signal processing circuitry 112 which may generate transmitter beamformer weights 113 and receiver beamformer weights 111. These embodiments are discussed in more detail below.

In some embodiments, encoder 122 may be a forward-error correcting (FEC) encoder, and decoder 152 may be a FEC decoder, although the scope of the invention is not limited in this respect. Although transmitter 102 and receiver 104 illustrate several functional elements in a certain order in the signal path, operations of these elements may also be performed in other orders.

In accordance with some embodiments of the present invention, receiver 104 receives training signals through multicarrier communication channel 103 through two or more receive-signal paths 143A & 143B. Signal processing circuitry 112 may estimate interference and noise spatial correlation matrix $R_{nn}(k)$ 107 and channel transfer junction $H_{nm}(k)$ for each of the plurality of subcarriers of multicarrier communication channel 103 from noise and interference signal samples obtained during the reception of the training signals.

Signal processing circuitry 112 may also generate beamformer weights 111 and 113 for the subcarriers using interference and noise spatial correlation matrices $R_{nn}(k)$ 107 and channel transfer functions $H_{nm}(k)$ 109 for use in subsequent commutation through channel 103.

In some embodiments, signal processing circuitry 112 obtains the noise and interference signal samples for each of the subcarriers by subtracting known (i.e., the transmitted) training signals multiplied by a channel transfer function $H_{nm}(k)$ from the (actual) received training signals. In some embodiments, signal processing circuitry 112 may generate receiver beamformer weights 111 and transmitter beamformer weights 113 for each of the subcarriers using one of the interference and noise spatial correlation matrices $R_{nn}(k)$ and one of the channel transfer functions $H_{nm}(k)$ associated with each subcarrier.

By taking into account noise and interference signals, the signal-to-noise ratio may be increased by allowing co-channel interference to be substantially cancelled through the application of transmitter beamformer weights 113 and receiver beamformer weights 111. In some WiFi and some WiMax embodiments, a maximum system throughput may be able to be realised, although the scope of the invention is not limited in this respect.

In some embodiments, signal processing circuitry 112 may generate receiver beamformer weights 111 and transmitter beamformer weights 113 for each of the subcarriers by performing a singular value decomposition (SVD) on a matrix generating by multiplying a factor of the interference and noise spatial correlation matrix $R_{nn}(k)$ and the channel transfer function $H_{nm}(k)$ associated with each subcarrier. In some embodiments, signal processing circuitry 112 may generate receiver beamformer weights 111 and transmitter beamformer weights 113 for each of the subcarriers by performing an SVD on a matrix generating by multiplying a negative half-root of the interference and noise spatial correlation matrix $R_{nn}(k)$ and the channel transfer function $H_{nm}(k)$ associated with each subcarrier. In some embodiments, the following equation may be used to generate the matrix: $R_{nn}^{-1/2}(k) \times H_{nm}(k)$ in which $R_{nn}(k)$ represents the interference and noise spatial correlation matrix for one subcarrier k, $H_{nm}(k)$ represents the channel transfer function for one subcarrier k, and k represents the subcarrier index or subcarrier number. In these representations of the interference and noise spatial correlation matrix $R_{nn}(k)$ and the channel transfer function $H_{nm}(k)$ 'm' may represent the number of transmitter antennas and 'n' may represent the number of receiver antennas used for communication through the MIMO channel. In these embodiments, the interference and noise spatial correlation matrix $R_{nn}(k)$ 107 may be a Hermitian matrix allowing the negative half-root to be readily calculated. In some embodiments, receiver beamformer weights 111 and transmitter beamformer weights 113 may comprise, respectively, receiver and transmitter beamformer weight vectors determined from maximum singular value (SVD) vectors corresponding to the maximum singular value of a matrix generated by $R_{nn}^{-1/2}(k) \times H_{nm}(k)$ although the scope of the invention is not limited in this respect.

In some embodiments, signal processing circuitry 112 may generate channel transfer function $H_{nm}(k)$ 109 for each of the subcarriers from a comparison between the actual received training signals and the known (i.e., the transmitted) training signals. In some embodiments, signal processing circuitry 112 may generate channel transfer function $H_{nm}(k)$ 109 for each of the subcarriers using frequency domain signals 145 for each subcarrier from signals received through the each of two or more receive-signal paths 143A & 143B.

In some embodiments, the known training signals may comprise signals having predetermined values and may be orthogonally transmitted by transmitter 102 by two or more spatially diverse transmit antennas 132. In some embodiments, orthogonal components of the known training signals may be transmitted on each spatially diverse transmit antenna 132. In some embodiments, an orthogonal training signal may be transmitted on each of spatially diverse transmit antennas 132. For example, symbols that, comprise the training signals may be transmitted on different subcarriers and/or at different times to achieve orthogonality between the transmissions of antennas 132. In some embodiments, the training signals may comprise short and/or long training sequences. In some embodiments, the training signals may comprise orthogonal frequency division multiplexed (OFDM) (training symbols transmitted on at least some of the subcarriers of multicarrier communication channel 103. In these embodiments, the training symbols may be transmitted on less than all subcarriers. In some of these embodiments, a channel transfer function may be generated for each subcarrier, including subcarriers that the training signals are not transmitted on.

In some embodiments, signal processing circuitry 112 may further generate channel transfer function $H_{nm}(k)$ 109 based on receipt of strong training signals. In these embodiments, the strong training signals may have a greater power level, may use a greater number of subcarriers, and/or may include a greater number of OFDM symbols than a standard training symbol, although the scope of the invention is not limited in this respect. In some embodiments, the use of strong training signals may help provide a better or more accurate channel transfer Inaction estimate resulting in a more accurate determination of the noise and Interference. In this way, more accurate beamformer weights that compensate for and possibly cancel co-channel interference may be generated.

In some embodiments, signal processing circuitry 112 may generate channel transfer function $H_{nm}(k)$ 109 and the interference and noise spatial correlation matrix $R_{nn}(k)$ for each subcarrier using some received data symbols of a subsequently received data packet. The use of some of the data symbols may be in addition to use of the training signals and may help improve the channel transfer function estimates and the interference and noise spatial correlation matrix estimates, although the scope of the invention is not limited in this respect.

In some embodiments, multicarrier communication channel 103 comprises a MIMO channel defined by two or more spatially-diverse transmit antennas 132 associated wish transmitter 102 and two or more spatially-diverse receive antennas 142 associated with the receiver 104. In these embodiments, each of the two or more spatially-diverse receive antennas 142 provides received signals through one of the receive-signal paths. In these embodiments, transmitter beamformer weights 113 may comprise frequency-domain weight vectors $z(k)$ for each transmit antenna 132 and for each subcarrier or group of subcarriers. In these embodiments, receiver beamformer weights 111 may comprise frequency-domain weight vectors $w(k)$ for each receive antenna 142 and for each subcarrier or group of subcarriers.

In some of these embodiments, receiver beamformer 146 may apply each one of receiver beamformer weights 111 in the frequency domain to each symbol-modulated subcarrier associated with the signals received through the two or more receive-signal paths to generate combined received signal $y(k)$ 147 corresponding to transmission, signal $x(k)$ 127. In these embodiments, transmitter beamformer 128 may apply each one of transmitter beamformer weights 113 to transmission signal x(k) 127 in the frequency domain to generate signals for each of transmit antennas 132 prior to transmission through channel 103. In some embodiments, transmitter beamformer weights 113 are provided by receiver 104 to transmitter 102 through a feedback path or feedback channel, as illustrated. In some embodiments, transmission signal x(k) 127 may be generated from single input bit stream 121 and receiver 104 may generate a corresponding single output bit stream 153, although the scope of the invention is limited in this respect.

In some embodiments, each of Fourier transform circuitry 144 may generate frequency domain samples 145 from the received training signals for use by signal processing circuitry 112 to estimate the spatial correlation matrices and the channel transfer functions for each of the subcarriers.

In some embodiments, transmitter 102 and receiver 104 may correspond to an access point and communication station, respectively. In some embodiments, transmitter 102 and receiver 104 may be WiFi communication stations. In some embodiments, transmitter 102 and receiver 104 may communicate OFDM signals. In some other embodiments, transmitter 102 and receiver 104 may comprise WiMax or broadband communication stations. In some embodiments, transmitter 102 and receiver 104 may communicate orthogonal frequency division multiple access (OFDMA) communication signals, although the scope of the invention is not limited in theses respects.

In some embodiments, signal processing circuitry 112 may include channel estimation and spatial correlation matrix estimation element 106 to generate channel transfer functions $H_{nm}(k)$ 109 and spatial corrosion matrices $R_{nn}(k)$ 107 for each subcarrier. In some embodiments, signal processing circuitry 112 may also include beamformer weight calculator 108 to generate transmitter beamformer weights 113 and receiver beamformer weights 111. In some embodiments, signal processing circuitry 112 may also include receiver beamformer 146 as well as other signal processing circuitry, although the scope of the invention is not limited in this respect.

Although transmitter 102 and receiver 104 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of transmitter 102 and/or receiver 104 may refer to one or more processes operating on one or more processing elements.

Figure 2:
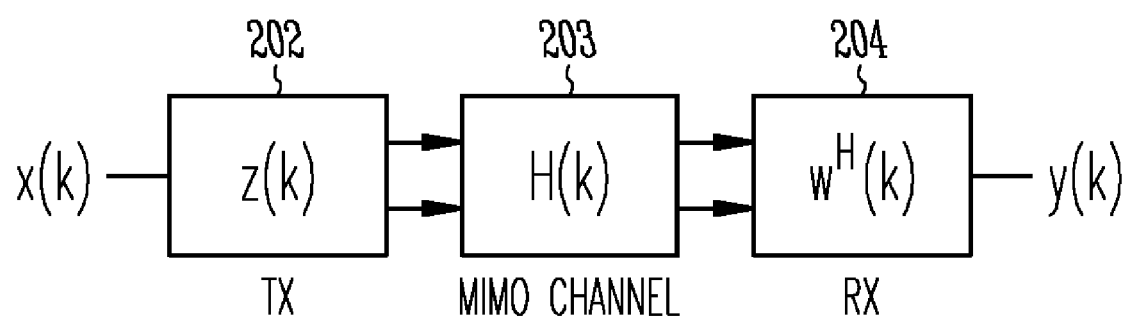
FIG. 2 is a signal processing diagram for a single subcarrier in accordance with some embodiments of the present invention.

FIG. 2 is a signal processing diagram for a single subcarrier in accordance with some embodiments of the present invention. In FIG. 2, MIMO channel 203 may correspond to channel 103 (FIG. 1) and H(k) may represent the channel transfer function for subcarrier k that may be determined by receiver 104 (FIG. 1). TX 202 may correspond to transmitter 102 (FIG. 1), x(k) may correspond to one subcarrier of transmission signal 127 (FIG. 1) and z(k) may represent the application of transmitter beamformer weights 113 (FIG. 1) by transmitter beamformer 128B (FIG. 1). RX 204 may correspond to receiver 104 (FIG. 1), y(k) may correspond to one subcarrier of received signal 147 (FIG. 1), and $w^H(k)$ may represent the application of receiver beamformer weights 111 (FIG. 1) by receiver beamformer 146 (FIG. 1).

As illustrated in FIG. 2, on a per-subcarrier basis, transmitter beamformer weight vector z(k) is applied to transmission signal x(k) in the frequency domain before being transmitted by transmitter 202 through MIMO channel 203 having transfer function H(k). At the receive side, the signal received through MIMO channel 203 through each antenna is converted to the frequency domain and receiver 204 applies receiver beamformer weight vector $w^H(k)$ to generate received signal y(k). Received signal y(k) may correspond to transmission signal x(k).

Figure 3:
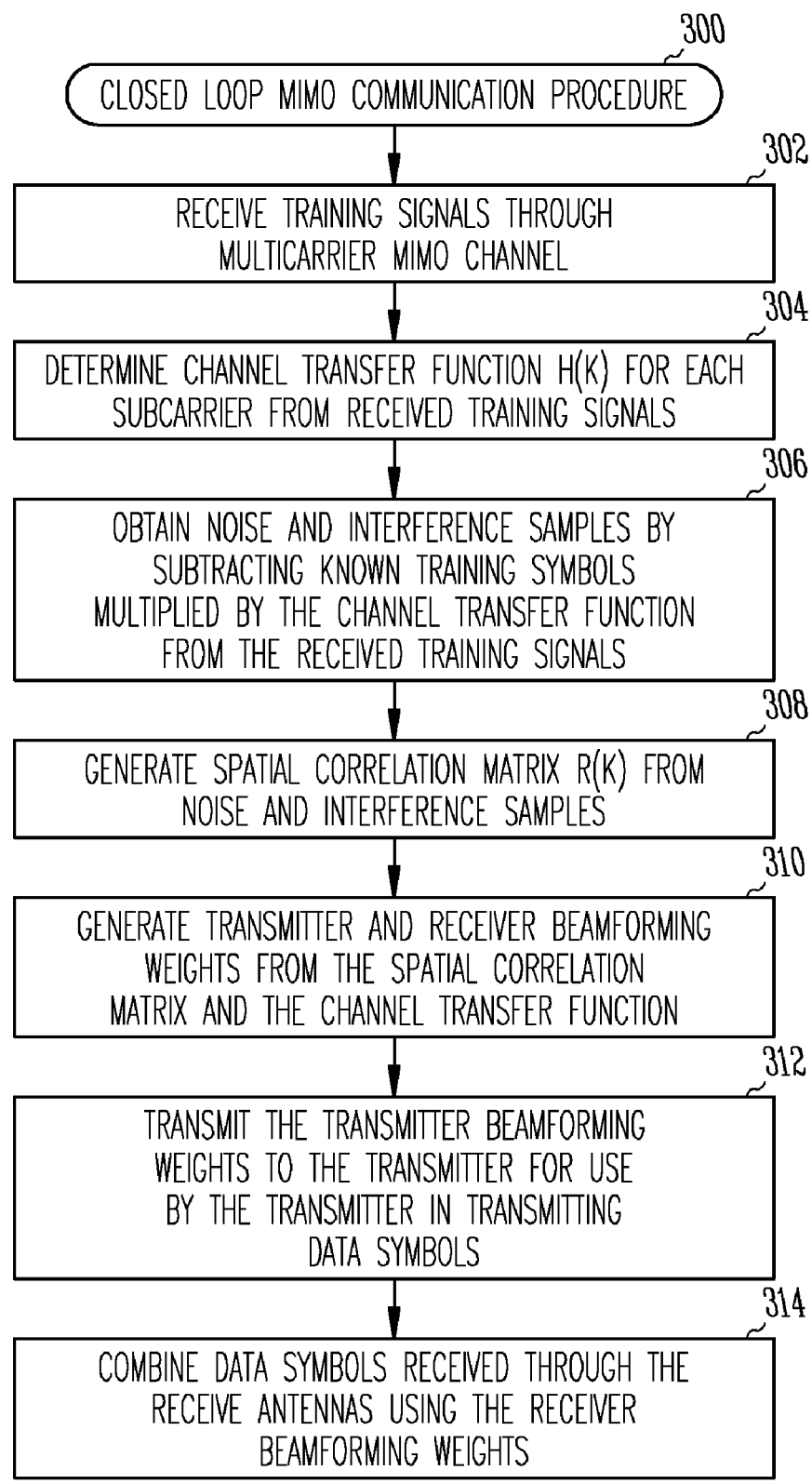
FIG. 3 is a flow chart of a closed-loop multiple-input multiple-output (MIMO) communication procedure in accordance with some embodiments of the present invention.

FIG. 3 is a flow chart of a closed-loop multiple-input multiple-output (MIMO) communication procedure in accordance with some embodiments of the present invention. Closed-loop MIMO communication procedure 300 may be performed by receiver 104 (FIG. 1) in conjunction with transmitter 102 (FIG. 1), although other receiver and transmitter configurations may also be suitable. Although the individual operations of procedure 300 are illustrated and described as separate operations, one or more of the individual operations may be performed concurrently, and nothing requires that the operations be performed in the order illustrated.

In operation 302, training signals may be received through a MIMO channel through two or more receive-signal paths of the receiver. Operation 302 may also comprise generating frequency-domain samples for each subcarrier from each of the receive-signal paths. The training signals may have been transmitted orthogonally by a transmitter on two or more transmit antennas. Operation 302 may be performed by Fourier transform circuitries 144 (FIG. 1), although the scope of the invention is not limited in this respect.

In operation 304, the channel transfer function $H_{nm}(k)$ for the MIMO channel may be determined for each subcarrier based on the received training signals. In some embodiments, signal processing circuitry 112 (FIG. 1) may perform operation 304.

In operation 306, noise and interference samples may be obtained by subtracting known draining signals multiplied by the channel transfer function $H_{nm}(k)$ from the received training signals. The more accurate the channel transfer functions, the more accurate the noise and interference samples may be. In some embodiments, signal processing circuitry 112 (FIG. 1) may perform operation 306.

Operation 308 comprises generating spatial correlation matrices $R_{nn}(k)$ for each subcarrier from the noise and interference samples.

The correlation between two signals shows how the value of the $1^{st}$ signal depends on value of the $2^{nd}$ and vice versa. In some embodiments, the correlation may be estimated by determining the average of the product of the last signal by the complex conjugate of the second signal. The correlation matrix may comprise correlation values for signals from different receiver antennas 142. In this example, the element $R_{nn}(k)[1,2]$ may represent the correlation between signals titan the $1^{st}$ and $2^{nd}$ receiver antennas, and $R_{nn}(k)[1,1]$ may be the autocorrelation value for the signal from the $1^{st}$ antenna. In some embodiments, the spatial correlation matrix estimation may include different enhancements in addition to the averaging discussed above. In some embodiments, signal processing circuitry 112 (FIG. 1) may perform operation 308.

Operation 310 comprises generating transmitter and receiver beamformer weights from both the interference and noise spatial correlation matrix $R_{nn}(k)$ and the channel transfer function matrix $H_{nm}(k)$ for each subcarrier. In some embodiments, signal processing circuitry 112 (FIG. 1) may perform operation 310.

Operation 312 comprises transmitting the transmitter beamformer weights to the transmitter for use in transmitting subsequent data symbols.

Operation 314 comprises receiving data symbols through the MIMO channel with two or more receive antennas and combining the received data symbols in the frequency domain based on the receiver beamformer weights. The data symbols may have been transmitted by the transmitter using the transmitter beamformer weights.

Referring back to FIG. 1, in some embodiments, transmitter 102 and receiver 104 may be part of wireless communication devices that may transmit and receive OFDM, communication signals over a multicarrier communication channel. The multicarrier communication channel may be within a predetermined frequency spectrum and may comprise a plurality of orthogonal subcarriers. In some embodiments, the orthogonal subcarriers may be closely spaced OFDM sub-carriers. To help achieve orthogonality between the closely spaced subcarriers, each subcarrier may have a null at substantially a center frequency of the other subcarriers. In some embodiments, to help achieve orthogonality between the closely spaced subcarriers, each subcarrier may have an integer number of cycles within a symbol period, although the scope of the invention is not limited, in this respect.

In some embodiments, the frequency spectrums for multi-carrier communication signals may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some broadband and WiMax embodiments, the frequency spectrum for communications may comprise frequencies between 2 and 11 GHz, although the scope of the invention is not limited in this respect.

In some embodiments, transmitter 102 and receiver 104 may communicate in accordance with specific communication standards, such as the Institute of Electrical and Electronics Engineers (IEEE) standards including IEEE 802.11 (a), 802.11(b), 802.11(g), 802.11(h) and/or 802.11(n) standards for wireless local area networks (WLANs), although transmitter 102 and receiver 104 may also be suitable to transmit and/or receive communications in accordance with other techniques including the Digital Video Broadcasting Terrestrial (DVB-T) broadcasting standard, and the High performance radio Local Area Network (HiperLAN) standard. In some broadband and WiMax embodiments, transmitter 102 and receiver 104 may transmit and receive broadband wireless communications in accordance with the IEEE 802.16 (e) standards for wireless metropolitan area networks (WMANs).

In some embodiments, transmitter 102 and receiver 104 may be part of portable wireless communication devices, such as personal digital assistant (PDA), a laptop or portable computer with wireless communication capability, a web tablet, a wireless telephone, a wireless headset, a pager, an instant messaging device, a digital camera, an access point, a television or other device that may receive and/or transmit information wirelessly.

Antennas 132 and 142 may comprise directional or omni-directional antennas, including, for example, dipole antennas, monopole antennas, patch antennas, loop antennas, microstrip antennas, or other types of antennas suitable for transmission of RF signals.

In some embodiments, the increase and possibly maximization of SNR using receiver signal optimization for co-channel interference cancellation may provide up to 5-6 dB or more of packet-error-rate (PER) and throughput improvement over some conventional MIMO-OFDM receivers. In some embodiments, system 100 may be more tolerant to co-channel interference and may be used for operations over longer distances, within higher interference environments and/or within noisier environments.

In some embodiments, during an initial training stage, receiver 104 may estimate MIMO channel transfer function $H_{nm}(k)$ for each subcarrier. During this initial training stage, receiver 104 may also estimate interference and noise spatial correlation matrices $R_{nn}(k)$ every subcarrier. The interference and noise spatial correlation matrices $R_{nn}(k)$ may comprise noise and co-channel interference estimates. In some embodiments, estimated for the interference and noise spatial correlation matrices $R_{nn}(k)$ may be obtained from the background using strong OFDM training or data symbols discussed above. Weight vectors for use by transmitter and receiver beamformers 128 and 146 may be calculated in accordance with an algorithm that may maximize SNR, although the scope of the invention is not limited in this respect.

In some embodiments, the transmitter and receiver weight vectors may be determined through an SVD technique, which may provide a more optimal solution for SNR maximization in the case of full adaptive beamforming without constraints on the transmitter and receiver beamformer weight vectors, In some embodiments when the transmitter weight vectors are calculated through the SVD of the matrix $R_{nn}^{-1/2}(k) \times H_{nm}(k)$, which may be written as $$R_{nn}^{-1/2} H = \sum_{i=1}^{M} \sigma_i u_i v_i^H.$$

Based on this equation, the transmitter beamformer weight vector for the k-th subcarrier z(k) may be set to $z(k)=v_1(k)$, in which $v_1(k)$ is an SVD vector corresponding to the maximum singular value $\sigma_1$.

The weight vectors for the receiver beamformer w(k) may be then set as $R_{nn}^{-1/2}(k)u_1(k)$ where $u_1(k)$ is an SVD vector complementary to vector $v_1(k)$ used for transmitter beamformer weighting.

In some other embodiments, increasing and/or maximizing SNR may be achieved by joint transmitter-receiver adaptive beamforming with additional constraints. In these embodiments, additional constraints may arise due to technical restrictions on antenna power loading and a limited amount of the channel feedback information.

Once the transmitter weight vectors z(k) are calculated, they may be sent to the transmitter using a feedback path illustrated in FIG. 1. In some alternative embodiments, transmitter beamformer weight vectors may be calculated by transmitter 102 based on channel feedback Information (CFI) provided by receiver 104. In these embodiments, the channel feedback information may include channel transfer functions 109 and spatial correlation matrices 107 generated by element 106 of receiver 104.

At a next stage of operation, transmitter 102 may transmits data to receiver 104 using transmitter beamformer weight vectors $z(k)=v_1(k)$ for each subcarrier or for each group of subcarriers. As illustrated in FIG. 1, the frequency domain outputs of transmitter beamformer 128 may feed inverse Fourier transform circuitry 130 and the resulting RF signals may be transmitted through MIMO channel 103 and received by multiple receive antennas 142. The received signals may be combined by receiver beamformer 146 using receiver weight vectors w(k) represent by weights 111.

As illustrated in FIG. 2, the received signal y(k) is generated after the application of the receiver beamformer weights for the k-th subcarrier and may be written as function of the transmitted signal x(f) as follows:

$$y(k) = w^H(k)H(k)z(k)x(k)w^H(k)n(k). \qquad \text{(Eq. 1)}$$

In this equation, k represents the subcarrier number, H(k) is n×m channel transfer function matrix for the k-th subcarrier, z(k) is an m×1 transmit beamformer weight vector, w(k) is an n×1 receiver beamformer weight vector, superscript H denotes a Hermitian transpose and n(k) represents the additive noise at the receiver including co-channel interference. In some embodiments, transmitter and receiver beamformer vectors z(k) and w(k) may increase or maximize SNR. The power transmitted from the antennas for each subcarrier may be constrained to unity as illustrated by the following equation:

$$<x^*(k)z^H(k)z(k)x(k)> = 1. \qquad \text{(Eq. 2)}$$

In this equation, < . . . > represents statistical averaging, superscript * represents a complex conjugate and $<x^*(k)x(k)> = 1$ the power of the signal supplied to transmitter beamformer 128 for the k-th subcarrier. In this example, the power level may be assumed to be equal for all subcarriers. Further considerations are provided for k-th subcarrier and index k is omitted for notation simplicity. Because vector z is not random, the power constraint equation (Eq. 2) may be rewritten as a condition for vector z to be of the unit length based on the following equation:

$$z^H z = |z|^2 = 1 \qquad \text{(Eq. 3)}$$

In these embodiments, the power of the useful signal for the k-th subcarrier may be represented as;

$$P_{Signal} = <y^* y> = w^H H z z^H H^H w \qquad \text{(Eq. 4)}$$

The noise plus co-channel interference power for the k-th subcarrier after processing by receiver beamformer 146 may be represented as:

$$P_{Noise} = <w^H n n^H w> = w^H <nn^h> w = w^H R_{nn} w \qquad \text{(Eq. 5)}$$

In this equation, $R_{nn}$ may represent the noise and co-channel interference spatial correlation matrix for the k-th subcarrier. The SNR for the k-th subcarrier may be written as:

$$SNR = \frac{w^H H z z^H H^H w}{w^H R_{nn} w} \qquad \text{(Eq. 6)}$$

With the introduction of the auxiliary vector $g = R_{nn}^{1/2} w$ into Eq. 6 yields:

$$SNR = \frac{g^H R_{nn}^{-1/2} H z z^H R_{nn}^{-1/2} g}{g^H g} \qquad \text{(Eq. 7)}$$

Without loss of generality, $g^H g = |g|^2 = 1$ and the numerator of Eq. 7 may be maximized. To determine vectors g and z, the SVD of n×m matrix $R_{nn}^{-1/2} H$ may be written as:

$$R_{nn}^{-1/2} H = U \Sigma H^H \ U = [u_1, \ldots u_N] \ V = [v_1, \ldots, v_M]$$
$$\Sigma = \text{diag}(\sigma_1, \ldots, \sigma_M) \qquad \text{(Eq. 8)}$$

In this equation, U and V may be unitary matrices and $\Sigma$ may be a diagonal matrix of singular values ($\sigma_1 \geq \sigma_2 \geq \ldots \geq \sigma_M$).

In another form the SVD of $R_{nn}^{1/2} H$, H may be represented as:

$$R_{nn}^{-1/2} H = \sum_{i=1}^{M} \sigma_i u_i v_i^H. \qquad \text{(Eq. 9)}$$

Using Eq. 9, the expression of Eq. 7 for SNR may be rewritten as:

$$SNR = \left( \sum_{i=1}^{M} \sigma_i g^H u_i v_i^H z \right) \left( \sum_{j=1}^{M} \sigma_j g^H u_j v_j^H z \right)^* = \qquad \text{(Eq. 10)}$$
$$\sum_{i=1}^{M} \sum_{j=1}^{M} \sigma_i \sigma_j g^H u_i v_i^H z z^H v_j u_j^H g$$

Differentiating Eq. 10 with respect to vector $g^H$ with constraint $g^H g = 1$ gives:

$$L = SNR + \lambda g^H g \qquad \text{(Eq. 11)}$$
$$\frac{\partial L}{\partial g^H} = \sum_{i=1}^{M} \sum_{j=1}^{M} \sigma_i \sigma_j u_i v_i^H z z^H v u_j^H g + \lambda g = 0$$

Denoting $\alpha_{ij} = \sigma_i \sigma_j v_i^H z z^H v$ Eq. 11 can be simplified to:

$$\frac{\partial L}{\partial g^H} = \sum_{i=1}^{M} \sum_{j=1}^{M} \alpha_{ij} u_i u_j^H g + \lambda g = 0 \qquad \text{(Eq. 12)}$$

The solutions of Eq. 12 with respect to g may be eigenvectors of matrix $$\sum_{i=1}^{M} \sum_{j=1}^{M} \alpha_{ij} u_i u_j^H.$$

As vectors $[u_1, \ldots, u_M]$ may be ortho-normal may be eigenvectors of matrix $$\sum_{i=1}^{M} \sum_{j=1}^{M} \alpha_{ij} u_i u_j^H,$$

optimal solutions may be $g = u_i$, (i=1, . . . , similarly, the SNR maximization of Eq. 10 with respect to vector z leads to extrema in $z = v_j$, (j=1, . . . , M).

Substitution into Eq. 10 may yield:

$$SNR(g = u_i, z = v_j) = \begin{cases} \sigma_i^2, & i = j \\ 0, & i \neq j \end{cases}.$$

As the singular values may be ordered as $\sigma_1 \geq \sigma_2 \geq \ldots \geq \sigma_M$, a maximum SNR for the given subcarrier may be obtained by using transmitter beamformer vector $z=v_1$ and receiver beamformer vector $w=R_{nn}^{1/2}u_1$.

Unless specifically Mated otherwise, terms such as processing, computing, calculating, determining, displaying, or the like, may refer to an action and/or process of one or more processing or computing systems or similar devices that may manipulate and transform data represented, as physical (e.g., electronic) quantities within a processing system's registers and memory into other data similarly represented as physical quantities within the processing system's registers or memories, or other such Information storage, transmission or display devices.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing information in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37C.F.R. Section 1.72(b) requiring an abstract that will allow the reader to ascertain, the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather as the following claims reflect, invention may lie in less than all features of a single disclosed embodiment. Thus the following claims are hereby incorporated into the detailed description, with each claim standing on its own as a separate preferred embodiment.

What is claimed is:

1. A multicarrier MIMO receiver for receiving through two or more spatially-diverse receive antennas comprising:
    two or more receive-signal paths to receive MIMO training signals through a MIMO channel; and
    signal processing circuitry to estimate a MIMO channel transfer function for each of a plurality of subcarriers of the MIMO channel from the received training signals, the signal processing circuitry to further estimate a spatial correlation matrix for the subcarriers from noise and interference signal samples obtained during the reception of the training signals, the signal processing circuitry to further generate beamformer weights for the subcarriers using the channel transfer functions and the spatial correlation matrices, the beamformer weights for use in subsequent communication through the MIMO channel,
    wherein to generate the spatial correlation matrices, the signal processing circuitry is configured to:
    multiply the MIMO channel transfer function estimate by the known training signals to obtain an estimate of the received training signals, the known training signals transmitted to provide orthogonality between transmissions of different spatially-diverse transmit antennas;
    sum the MIMO training signals including any noise and interference received through the two or more receive antennas to obtain an overall received signal for each subcarrier; and
    subtract the estimate of the received training signals from the overall received signal to obtain the noise and interference signal samples for each of the subcarriers for use in generating the spatial correlation matrices.

2. The receiver of claim 1 wherein the signal processing circuitry generates receiver and transmitter beamformer weights for each of the subcarriers using one of the spatial correlation matrices and one of the channel transfer functions associated with each subcarrier.

3. The receiver of claim 2 wherein the signal processing circuitry generates the receiver and transmitter beamformer weights for each of the subcarriers by performing a singular value decomposition on a matrix generating by multiplying a factor of the spatial correlation matrix and the MIMO channel transfer function associated with each subcarrier.

4. The receiver of claim 2 wherein the MIMO channel is a multiple-input multiple-output channel defined by the two or more spatially-diverse transmit antennas associated with a transmitter and the two or more spatially-diverse receive antennas associated with the receiver,
    wherein each of the two or more spatially-diverse receive antennas provides received signals to one of the receive-signal paths,
    wherein the transmitter beamformer weights include frequency-domain weight vectors for each transmit antenna and each subcarrier, and
    wherein the receiver beamformer weights include frequency-domain weight vectors for each receive antenna and each subcarrier.

5. The receiver of claim 4 further comprising a receiver beamformer to apply the receiver beamformer weights in the frequency domain to each symbol-modulated subcarrier to each of signals received through the two or more receive-signal paths and to generate a combined received signal corresponding to a transmission signal,
    wherein a transmitter beamformer of the transmitter applies the transmitter beamformer weights to the transmission signal in the frequency domain to generate a signal for each of the transmit antennas prior to transmission through the channel.

6. The receiver of claim 5 further comprising Fourier transform circuitry associated with each of the two or more receive-signal paths to generate frequency domain samples from the received training signals for use by the signal processing circuitry to estimate the spatial correlation matrices and the channel transfer functions for each of the subcarriers.

7. The receiver of claim 1 wherein the signal processing circuitry is to further generate the MIMO channel transfer function for the subcarriers from the received training signals and the known training signals.

8. The receiver of claim 7 wherein the signal processing circuitry generates the MIMO channel transfer function for each of the subcarriers using frequency domain signals for each subcarrier from signals received through the each of the two or more receive-signal paths.

9. The receiver of claim 7 wherein the known training signals comprise signals having predetermined values and are orthogonally transmitted by a transmitter through the two or more spatially-diverse transmit antennas.

10. The receiver of claim 9 wherein the signal processing circuitry further generates the MIMO channel transfer functions based on receipt of strong training signals, the strong training signals having at least one of a greater power level and a greater number of symbols than a standard training symbol.

11. The receiver of claim 9 wherein the signal processing circuitry further generates the MIMO channel transfer function and the spatial correlation matrix for the subcarriers using some received data symbols of a subsequently received data packet.

12. A method performed by a multicarrier MIMO receiver for receiving through two or more spatially-diverse receive antennas, the method comprising:
    estimating a MIMO channel transfer function for each of a plurality of subcarriers of a MIMO channel from received MIMO training signals, the MIMO training signals being received through two or more receive-signal paths of the MIMO receiver;
    estimating a spatial correlation matrix for the subcarriers from noise and interference samples obtained during the reception of the training signals through two or more receive-signal paths; and
    generating receiver and transmitter beamformer weights for the subcarriers using the MIMO channel transfer functions and the spatial correlation matrices for use in subsequent communication through the MIMO channel,
    wherein estimating the spatial correlation matrices comprises:
    multiplying the MIMO channel transfer function estimate by known training signals to obtain an estimate of the received training signals, the known training signals transmitted to provide orthogonality between transmissions of different spatially-diverse transmit antennas; and
    summing the MIMO training signals including any noise and interference received through the two or more receive antennas to obtain an overall received signal for each subcarrier; and
    subtracting the estimate of the received training signals from the overall received signal to obtain the noise and interference signal samples for each of the subcarriers for use in generating the spatial correlation matrices.

13. The method of claim 12 wherein generating the receiver and transmitter beamformer weights for each of the subcarriers comprises using one of the spatial correlation matrices and one of the MIMO channel transfer functions associated with each subcarrier.

14. The method of claim 13 wherein generating the receiver and transmitter beamformer weights for the subcarriers comprises performing a singular value decomposition on a matrix generating by multiplying a factor of the spatial correlation matrix and the channel transfer function associated with each subcarrier.

15. The method of claim 12 further comprising generating the MIMO channel transfer function for each of the subcarriers from the received MIMO training signals and the known training signals.

16. The method of claim 15 wherein generating the MIMO channel transfer function for each of the subcarriers comprises using frequency domain signals for each subcarrier from signals received through the each of the two or more receive-signal paths.

17. The method of claim 15 wherein the known training signals comprise signals having predetermined values and are orthogonally transmitted by a transmitter through the two or more spatially diverse transmit antennas.

18. The method of claim 17 wherein the MIMO channel transfer functions are generated based on receipt of strong training signals, the strong training signals having at least one of a greater power level and a greater number of symbols than a standard training symbol.

19. The method of claim 17 wherein the MIMO channel transfer functions and the spatial correlation matrices are further generated using some received data symbols of a subsequently received data packet.

20. The method of claim 12 wherein the MIMO channel is a multiple-input multiple-output channel defined by the two or more spatially-diverse transmit antennas associated with a transmitter and the two or more spatially-diverse receive antennas associated with the receiver,
    wherein each of the two or more spatially-diverse receive antennas provides received signals to one of the receive-signal paths,
    wherein the transmitter beamformer weights include frequency-domain weight vectors for each transmit antenna and each subcarrier, and
    wherein the receiver beamformer weights include frequency-domain weight vectors for each receive antenna and each subcarrier.

21. The method of claim 20 further comprising applying the receiver beamformer weights in the frequency domain to each symbol-modulated subcarrier to each of signals received through the two or more receive-signal paths to generate a combined received signal corresponding to a transmission signal,
    wherein the transmitter beamformer weights are applied to the transmission signal in the frequency domain to generate a signal for each of the transmit antennas prior to transmission through the channel.

22. The method of claim 21 further comprising performing a Fourier transform on the received training signals in each of the two or more receive-signal paths to generate frequency domain samples for use by the signal processing circuitry in estimating the spatial correlation matrices and the channel transfer functions for each of the subcarriers.

* * * * *

UNITED STATES PATENT AND TRADEMARK OFFICE
CERTIFICATE OF CORRECTION

| | | |
|---|---|---|
| PATENT NO. | : 7,860,183 B2 | Page 1 of 1 |
| APPLICATION NO. | : 11/422104 | |
| DATED | : December 28, 2010 | |
| INVENTOR(S) | : Alexander A. Maltsev et al. | |

It is certified that error appears in the above-identified patent and that said Letters Patent is hereby corrected as shown below:

On the Title page, in field (57), under "Abstract", in column 2, lines 2-3, delete "$H_{nm}(K)$" and insert -- $H_{nm}(k)$ --, therefor.

Signed and Sealed this
Eighth Day of March, 2011

David J. Kappos
*Director of the United States Patent and Trademark Office*